(12) United States Patent
Toyosawa et al.

(10) Patent No.: US 11,830,533 B2
(45) Date of Patent: Nov. 28, 2023

(54) METHOD OF PRODUCING MAGNETIC POWDER AND METHOD OF PRODUCING MAGNETIC RECORDING MEDIUM

(71) Applicant: SONY CORPORATION, Tokyo (JP)

(72) Inventors: Natsuki Toyosawa, Miyagi (JP); Norikatsu Fujisawa, Miyagi (JP); Yuta Akimoto, Miyagi (JP); Satoru Abe, Miyagi (JP); Masaru Terakawa, Miyagi (JP); Katsunori Maeshima, Miyagi (JP); Atsushi Muramatu, Miyagi (JP); Masafumi Nakaya, Miyagi (JP)

(73) Assignee: Sony Corporation, Tokyo (JP)

( * ) Notice: Subject to any disclaimer, the term of this patent is extended or adjusted under 35 U.S.C. 154(b) by 570 days.

(21) Appl. No.: 17/043,452

(22) PCT Filed: Mar. 27, 2019

(86) PCT No.: PCT/JP2019/013367
§ 371 (c)(1),
(2) Date: Sep. 30, 2020

(87) PCT Pub. No.: WO2019/189468
PCT Pub. Date: Oct. 3, 2019

(65) Prior Publication Data
US 2021/0027807 A1  Jan. 28, 2021

(30) Foreign Application Priority Data
Mar. 30, 2018  (JP) .................. 2018-069880

(51) Int. Cl.
*C01G 49/04* (2006.01)
*C01G 49/08* (2006.01)
(Continued)

(52) U.S. Cl.
CPC .............. *G11B 5/842* (2013.01); *C01G 49/04* (2013.01); *C01G 49/08* (2013.01); *C09C 1/24* (2013.01);
(Continued)

(58) Field of Classification Search
None
See application file for complete search history.

(56) References Cited

U.S. PATENT DOCUMENTS 5,401,313 A * 3/1995 Supplee ................. C04B 20/12
106/490
2011/0204027 A1 * 8/2011 Moriya ................ C09K 3/1409
156/345.12
(Continued)

FOREIGN PATENT DOCUMENTS

CN  102307916 A  1/2012
CN  103014285 A  4/2013
(Continued)

OTHER PUBLICATIONS

International Search Report dated May 28, 2019 in International Application No. PCT/JP2019/013367.

*Primary Examiner* — Kevin M Bernatz
(74) *Attorney, Agent, or Firm* — K&L Gates LLP

(57) ABSTRACT

[Solving Means] A method of producing a magnetic powder includes: coating a surface of each of silica-coated precursor particles with at least one type of coating agent of a metal chloride or a sulfate; and firing the precursor particles coated with the coating agent.

16 Claims, 9 Drawing Sheets

(51) Int. Cl.
*C09C 1/24* (2006.01)
*G11B 5/842* (2006.01)
*G11B 5/706* (2006.01)
*H01F 1/11* (2006.01)
*G11B 5/712* (2006.01)

(52) U.S. Cl.
CPC ...... *G11B 5/70605* (2013.01); *G11B 5/70642* (2013.01); *G11B 5/712* (2013.01); *H01F 1/11* (2013.01); *C01P 2002/60* (2013.01); *C01P 2004/84* (2013.01); *C01P 2006/42* (2013.01)

(56) References Cited

U.S. PATENT DOCUMENTS

| | | | |
|---|---|---|---|
| 2014/0091501 A1* | 4/2014 | Hattori | B82Y 30/00 264/611 |
| 2018/0033528 A1* | 2/2018 | Sakane | G11B 5/714 |
| 2018/0170767 A1* | 6/2018 | Ohkoshi | C09C 1/22 |

FOREIGN PATENT DOCUMENTS

| | | |
|---|---|---|
| CN | 104107693 A | 10/2014 |
| CN | 106471581 A | 3/2017 |
| JP | S-5732003 A | 2/1982 |
| JP | S64-077901 A | 3/1989 |
| JP | 2002216336 A | 8/2002 |
| JP | 2008-100871 A | 5/2008 |
| JP | 2011-035006 A | 2/2011 |
| JP | 2011-173958 A | 9/2011 |
| JP | 2017-001944 A | 1/2017 |
| JP | 2017-024981 A | 2/2017 |
| KR | 100648827 B1 | 11/2006 |

\* cited by examiner

METHOD OF PRODUCING MAGNETIC POWDER AND METHOD OF PRODUCING MAGNETIC RECORDING MEDIUM

TECHNICAL FIELD

The present disclosure relates to a method of producing a magnetic powder and a method of producing a magnetic recording medium.

BACKGROUND ART

ε-iron oxide (ε-$Fe_2O_3$) is expected to be applied to a magnetic recording material of a coating-type magnetic recording medium. ε-iron oxide is generally synthesized by firing precursor particles at a high temperature of 1000° C. or more for a long time. During this synthesis, there is a possibility that precursor particles aggregate with each other to generate coarse particles. In this regard, in order to suppress the aggregation of the precursor particles, a technology for coating precursor particles with silica before firing (see, e.g., Patent Literature 1).

CITATION LIST

Patent Literature

Patent Literature 1: Japanese Patent Application Laid-open No. 2008-100871

DISCLOSURE OF INVENTION

Technical Problem

However, it is difficult to suppress the formation of coarse particles only by coating precursor particles with silica before firing as described above.

It is an object of the present disclosure to provide a method of producing a magnetic powder and a method of producing a magnetic recording medium, which are capable of suppressing the generation of coarse particles.

Solution to Problem

In order to achieve the above-mentioned object, a first disclosure is a method of producing a magnetic powder, including: coating a surface of each of silica-coated precursor particles with at least one type of coating agent of a metal chloride or a sulfate; and firing the precursor particles coated with the coating agent.

A second disclosure is a method of producing a magnetic recording medium, including: coating a surface of each of silica-coated precursor particles with at least one type of coating agent of a metal chloride or a sulfate; preparing magnetic particles by firing the precursor particles coated with the coating agent; removing the silica coating and the coating agent from the magnetic particles; and forming a recording layer using the magnetic particles after the removing.

Advantageous Effects of Invention

In accordance with the present disclosure, it is possible to suppress the generation of coarse particles. It should be noted that the effect described here is not necessarily limitative and may be any effect described in the present disclosure or an effect different from them.

Figure 3:
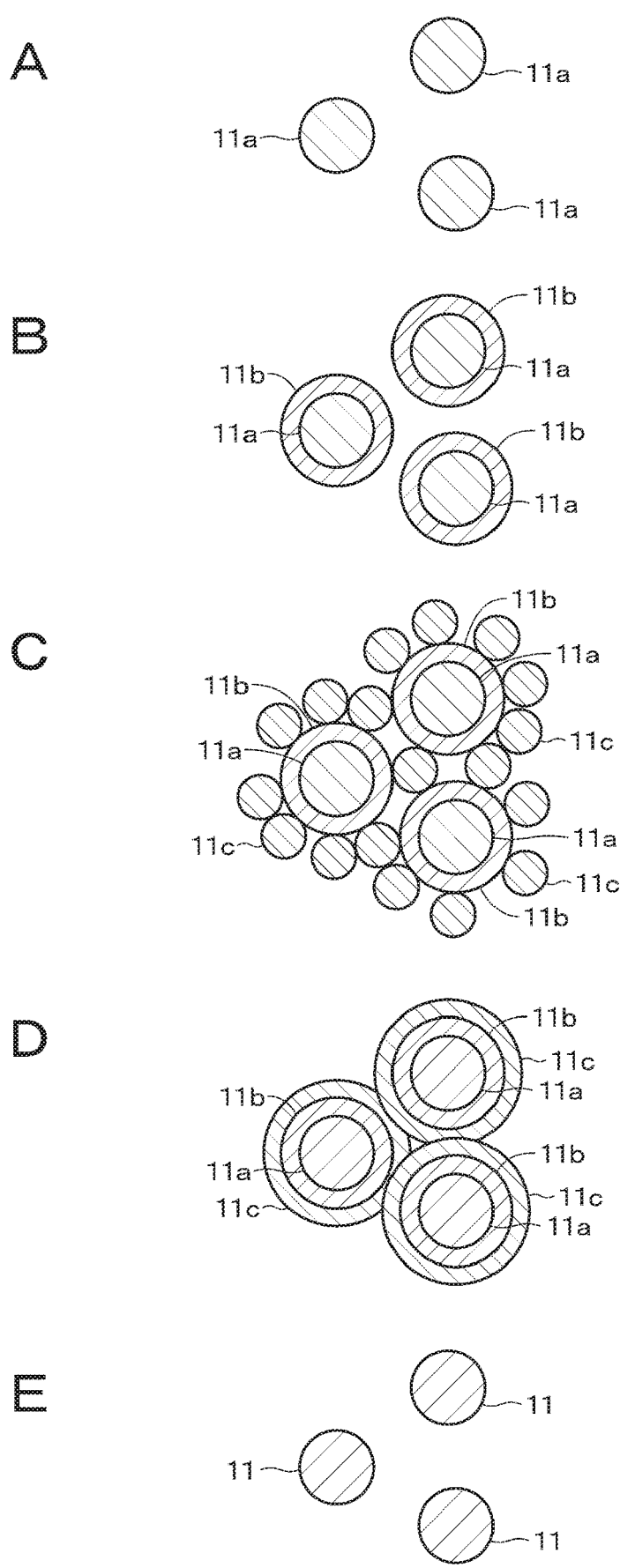

Part A to Part E of FIG. 3 are each a cross-sectional view for describing the method of producing a magnetic powder according to the first embodiment of the present disclosure.

Figure 4:
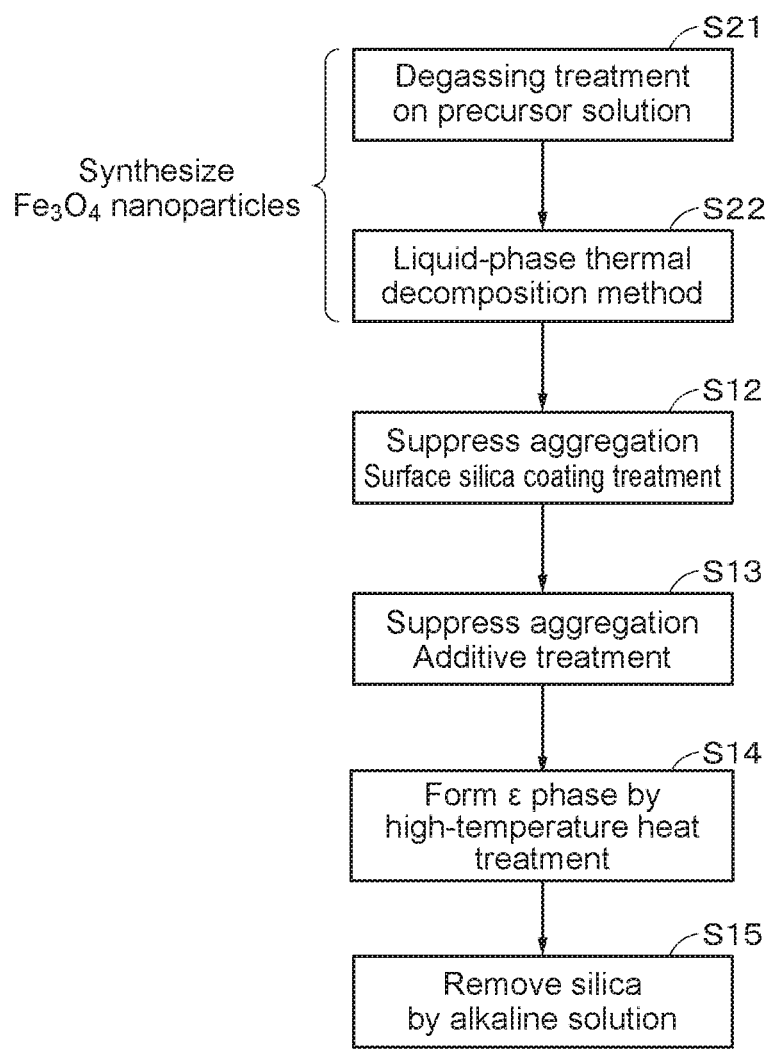

FIG. 4 is a process chart for describing a method of producing a magnetic powder according to a second embodiment of the present disclosure.

Figure 5:
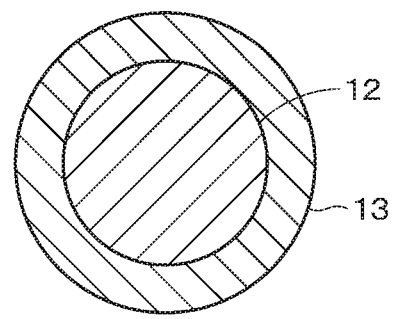

FIG. 5 is a cross-sectional view of a magnetic powder according to a third embodiment of the present disclosure.

Figure 6:
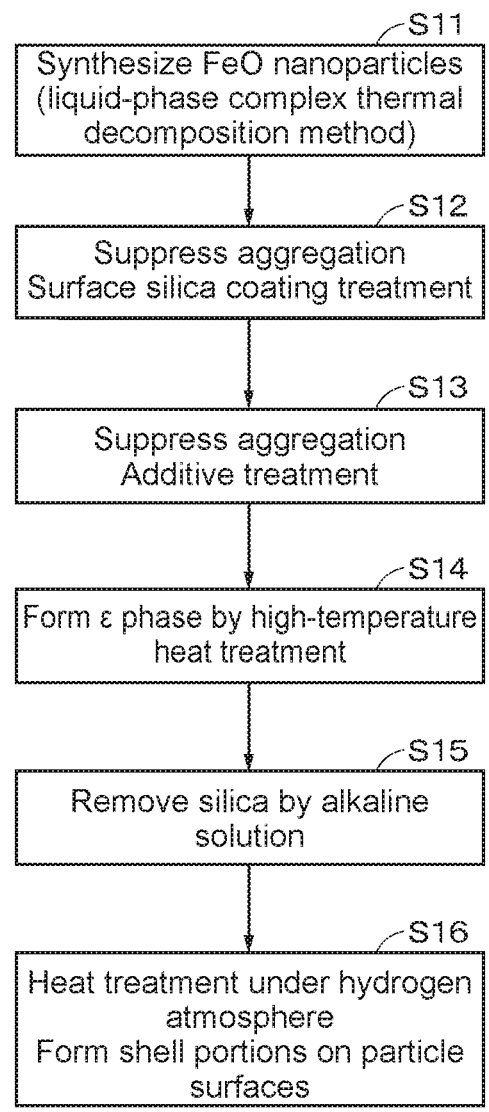

FIG. 6 is a process chart for describing the method of producing a magnetic powder according to the third embodiment of the present disclosure.

Figure 7:
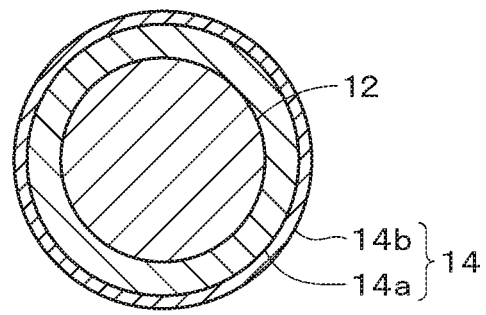

FIG. 7 is a cross-sectional view of a magnetic powder according to a fourth embodiment of the present disclosure.

Figure 8:
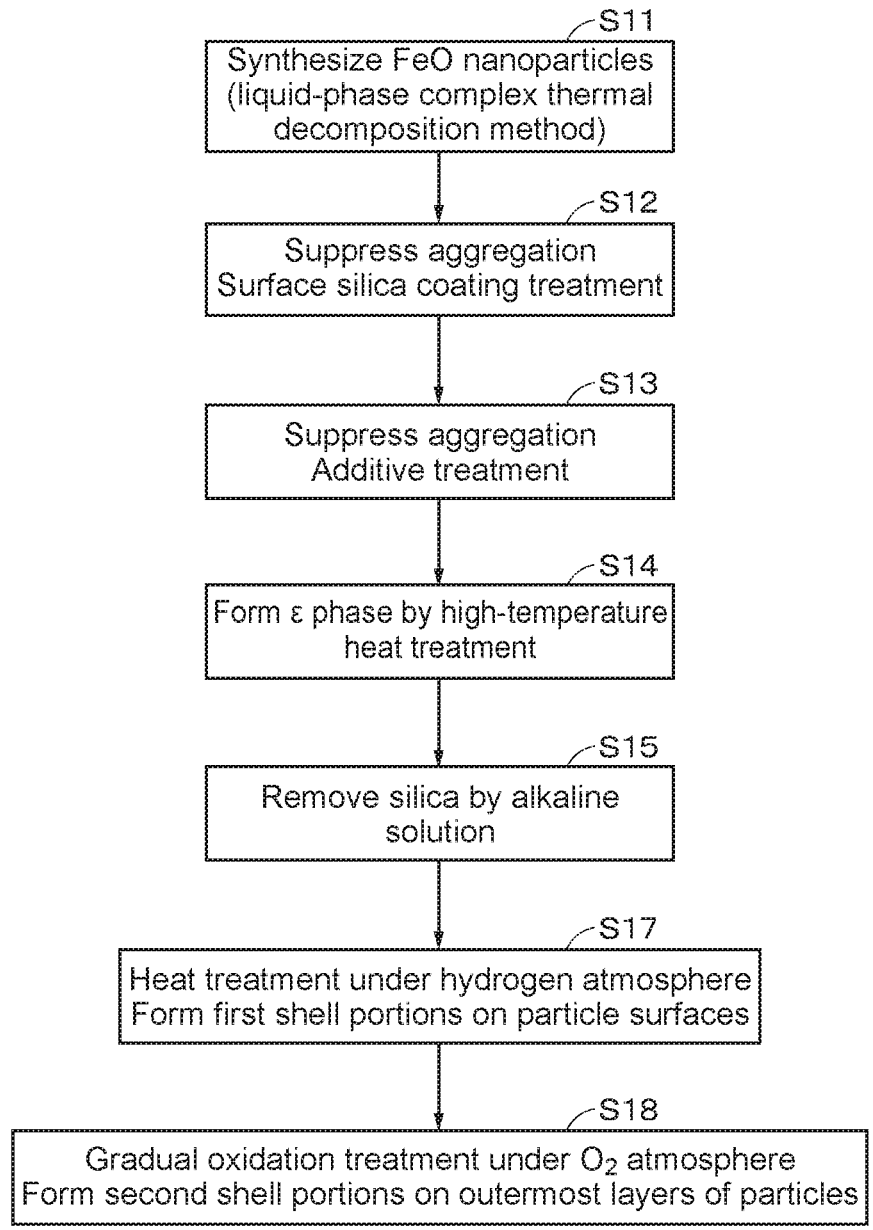

FIG. 8 is a process chart for describing a method of producing the magnetic powder according to the fourth embodiment of the present disclosure.

Figure 9:
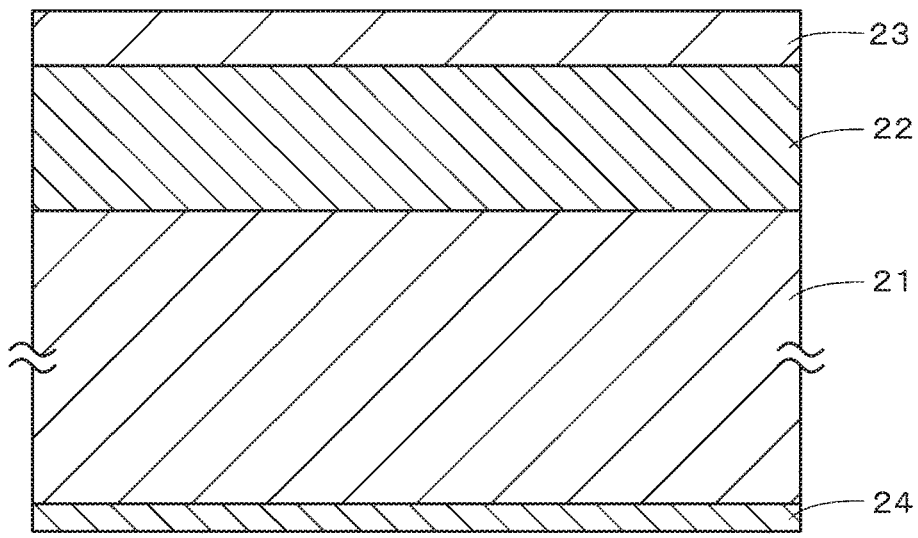

FIG. 9 is a cross-sectional view of a magnetic recording medium according to a fifth embodiment of the present disclosure.

Figure 10:
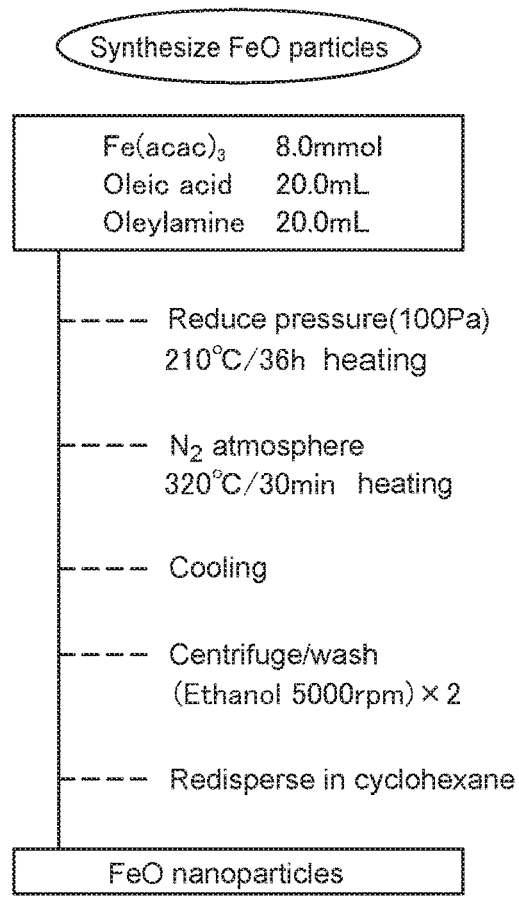

FIG. 10 is a process chart for describing a process of synthesizing FeO nanoparticles.

Figure 11:
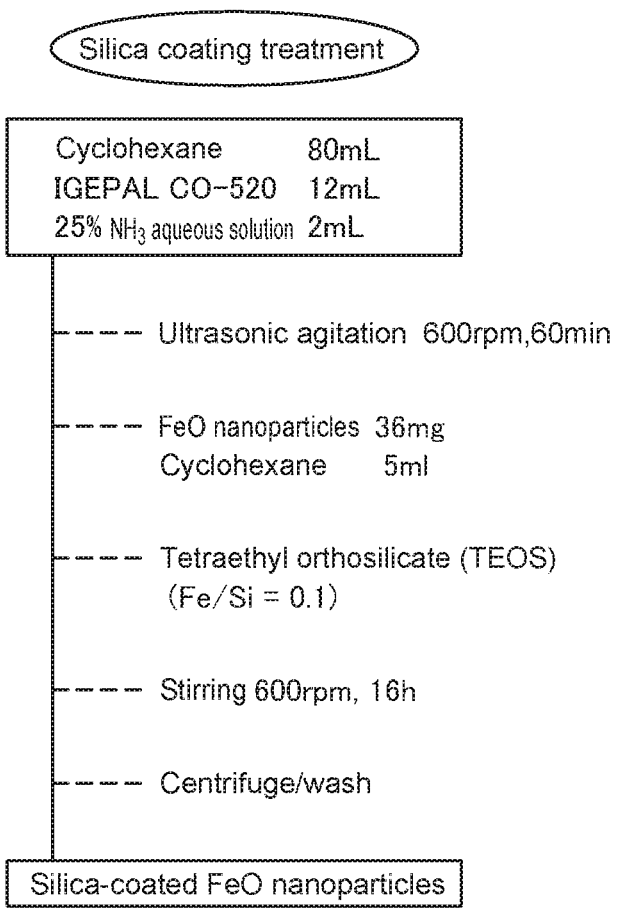

FIG. 11 is a process chart for describing a treatment process of silica coating.

Figure 12:
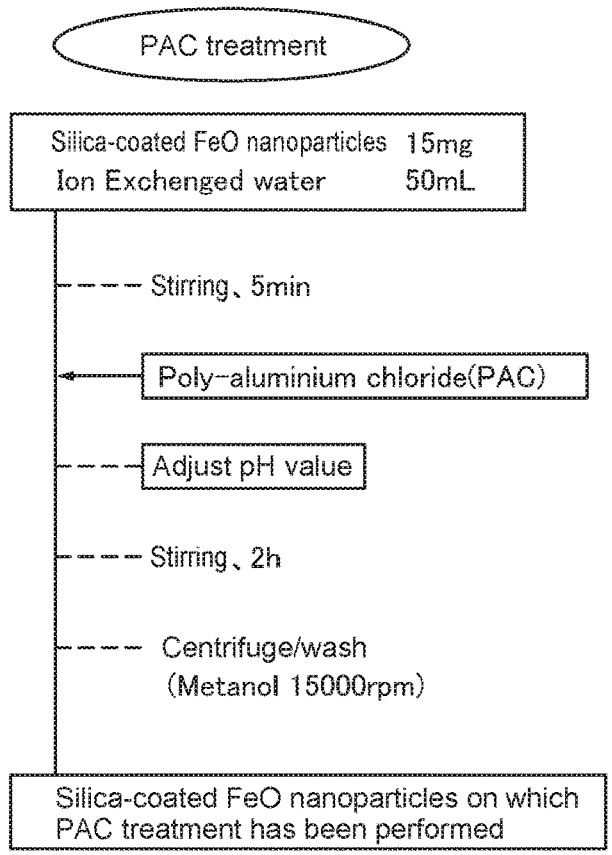

FIG. 12 is a process chart for describing a treatment process of a coating agent.

Figure 13:
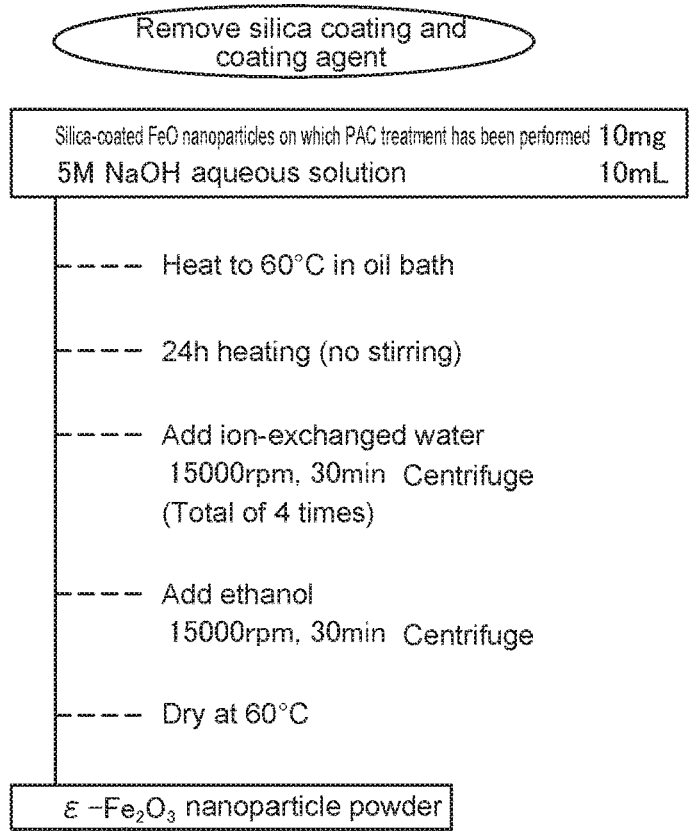

FIG. 13 is a process chart for describing a removal process of the silica coating and the coating agent.

Figure 14:
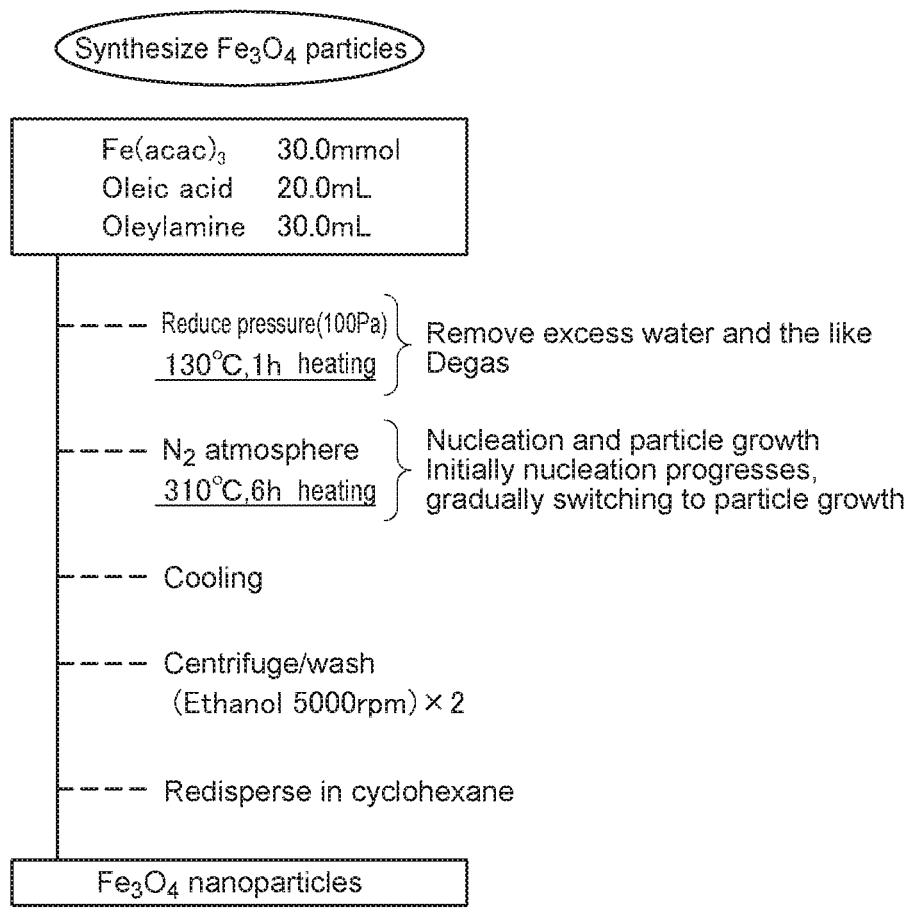

FIG. 14 is a process chart for describing a process of synthesizing $Fe_3O_4$ nanoparticles.

MODE(S) FOR CARRYING OUT THE INVENTION

Embodiments of the present disclosure will be described in the following order.
1 First embodiment (example of magnetic powder)
2 Second embodiment (example of magnetic powder)
3 Third embodiment (example of magnetic powder)
4 Fourth embodiment (example of magnetic powder)
5 Fifth embodiment (example of magnetic recording medium)

1 First Embodiment

[Configuration of Magnetic Powder]

A magnetic powder according to a first embodiment of the present disclosure includes a powder of hard magnetic nanoparticles (hereinafter, referred to as the "ε-iron oxide particles") containing ε-iron oxide. The magnetic powder according to the first embodiment is suitable for use in a recording layer (magnetic layer) of a magnetic recording medium having a high density. The ε-iron oxide particles each have, for example, a substantially cubic shape or a substantially spherical shape. The ε-iron oxide contained in the ε-iron oxide particles favorably has an ε-$Fe_2O_3$ crystal (containing those in which a part of Fe site is substituted with a metal element M) as the main phase, and more favorably has ε-$Fe_2O_3$ of a single phase. The metal element M is, for example, at least one of Al, Ga, or In. However, when the molar ratio of M and Fe in the iron oxide is expressed as M:Fe=x:(2−x), the relationship pf 0≤x<1 is satisfied.

In the present disclosure, unless otherwise specified, examples of the ε-Fe$_2$O$_3$ crystal include, in addition to a pure ε-Fe$_2$O$_3$ crystal in which the Fe site is not substituted with another element, a crystal in which a part of the Fe site is substituted with a trivalent metal element M and the space group is the same as that of the pure ε-Fe$_2$O$_3$ crystal (i.e., the space group is Pna2$_1$).

(Crystallite Size)

The crystallite size of the ε-iron oxide particles is favorably 8 nm or more and 30 nm or less, and more favorably 12 nm or more and 20 nm or less. In the case where the crystallite size is less than 8 nm, there is a possibility that a coercive force Hc decreases due to the effect of thermal fluctuation. Meanwhile, in the case where the crystallite size exceeds 30 nm, there is a possibility that it is difficult to obtain a magnetic recording medium having a high recording density.

(Average Particle Size)

An average particle size $D_{ave}$ of the magnetic powder is favorably 8 nm or more and 30 nm or less, and more favorably 12 nm or more and 20 nm or less. In the case where the average particle size $D_{ave}$ of the magnetic powder is less than 8 nm, it is difficult to disperse the magnetic powder during preparation of a magnetic recording medium and there is a possibility that C/N of the magnetic recording medium deteriorates. Meanwhile, in the case where the average particle size $D_{ave}$ of the magnetic powder exceeds 30 nm, there is a possibility that it is difficult to obtain a magnetic recording medium having a high recording density.

The above-mentioned average particle size $D_{ave}$ of the magnetic powder is obtained as follows. First, the magnetic powder is imaged using a transmission electron microscope (TEM). Next, 500 ε-iron oxide particles are randomly selected from the taken TEM photograph, and an area S of each of the particles is obtained. Next, assuming that the cross-sectional shape of the particle is circular, a particle diameter (diameter) R of each particle is calculated as the particle size on the basis of the following formula to obtain the particle size distribution of the magnetic powder.

$$R = 2 \times (S/\pi)^{1/2}$$

Next, the median diameter (50% diameter, D50) is obtained from the obtained particle size distribution and is used as the average particle size $D_{ave}$.

(Coefficient of Variation)

The coefficient of variation of a magnetic powder represented by the following formula (1) is 30% or less.

Coefficient of variation[%]=([standard deviation of the particle size]/[average particle size])×100   (1)

In the case where the coefficient of variation exceeds 30%, there is a possibility that the particle size of the ε-iron oxide particles varies greatly and magnetic properties of the magnetic powder vary greatly.

The above-mentioned coefficient of variation of the magnetic powder is obtained as follows. First, the particle size distribution of the magnetic powder is obtained in a way similar to the method above-mentioned of calculating the average particle size. Next, the median diameter (50% diameter, D50) is obtained from the obtained particle size distribution and is used as the average particle size $D_{ave}$. Further, a standard deviation 6 is obtained from the obtained particle size distribution. Next, $\sigma/D_{ave}$ is calculated from the obtained average particle size $D_{ave}$ and the obtained standard deviation σ of the particle size distribution and is used as the coefficient of variation.

(SFD)

Figure 1:
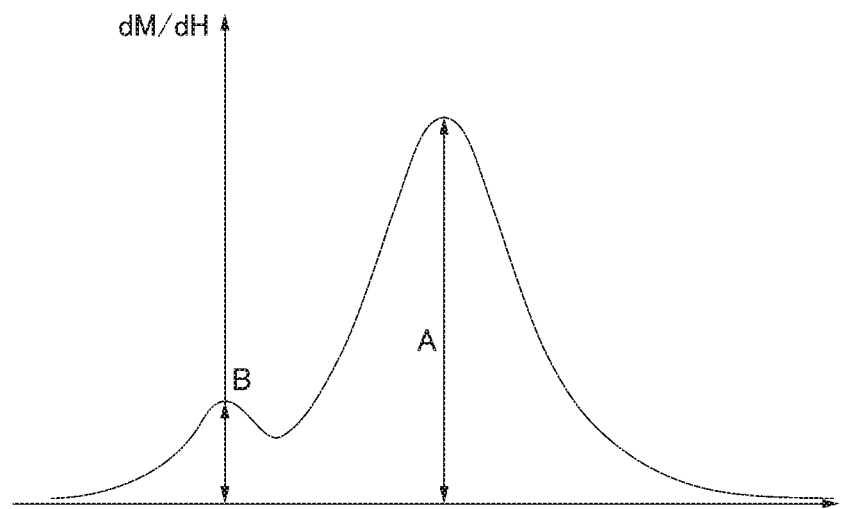
FIG. 1 is a graph showing an example of an SFD curve.

In an SFD (Switching Field Distribution) curve of the magnetic powder, a ratio B/A of a main peak height A and the sub-peak height B near the zero magnetic field is 0.5 or less (see FIG. 1). In the case where the ratio B/A exceeds 0.5, there is a possibility that the particle size of the ε-iron oxide particles varies greatly and magnetic properties of the magnetic powder vary greatly.

The above-mentioned ratio B/A is obtained as follows using a vibrating sample magnetometer (VSM) or a superconducting quantum interference device (SQUID). First, the magnetic powder is sampled into a predetermined shape. The sampling method can be freely selected within a range that does not affect measurement, such as compaction into a measurement capsule and attachment to a measurement tape. Next, the M-H loop of a magnetic powder sample is measured, and an SFD curve is calculated from the obtained M-H curve. A program attached to the measuring device may be used for calculating the SFD curve, or another program may be used. Here, the measurement of the M-H loop is performed at room temperature (23° C.). Next, assuming that the absolute value of the point where the obtained SFD curve crosses a Y axis (dM/dH) is "B" and the height of the main peak seen near the coercive force Hc in the M-H loop is "A", a ratio B/A is calculated.

[Method of Producing Magnetic Powder]

Figure 2:
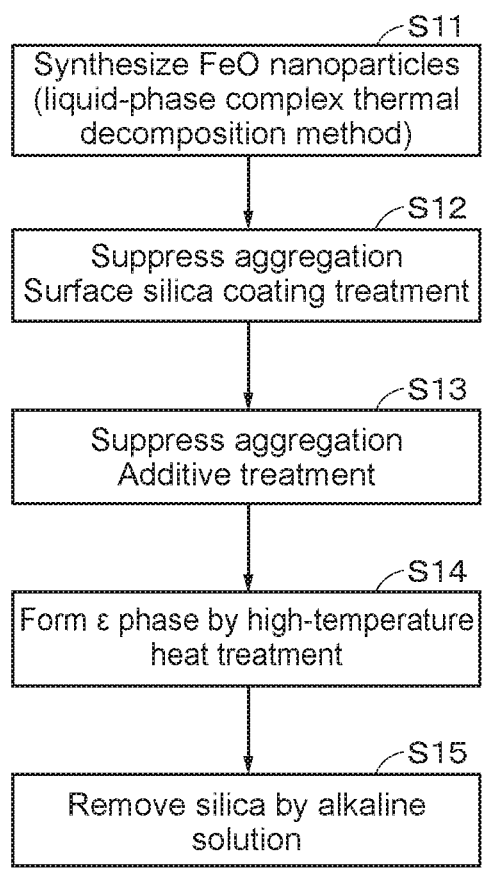
FIG. 2 is a process chart for describing a method of producing a magnetic powder according to a first embodiment of the present disclosure.

Hereinafter, a method of producing the magnetic powder according to the first embodiment of the present disclosure will be described with reference to FIG. 2 and Part A of FIG. 3 to Part E of FIG. 3. This method of producing the magnetic powder synthesizes a powder of the ε-iron oxide particles using, as a starting material, a powder of nanoparticles (hereinafter, referred to as the "FeO particles".) containing FeO (ferrous oxide).

(Synthesis of FeO Particles)

First, in Step S11, a powder of FeO particles (precursor particles) 11a as a starting material shown in Part A of FIG. 3 is synthesized in a vacuum by a liquid-phase complex thermal decomposition method. At this time, it is favorable to use oleic acid and oleylamine as a solvent and a ligand. This is because the FeO particles 11a with less aggregation can be synthesized, and thus a powder of the FeO particles 11a having a sharp particle size distribution can be obtained. The FeO particles may contain, for example, at least one metal of Al, Ga, or In.

In the above-mentioned process, it is favorable to synthesize the powder of the FeO particles 11a so that the particle size distribution of the powder of the FeO particles 11a is substantially similar to the particle size distribution of the target powder of the ε-iron oxide particles. Specifically, it is favorable that the coefficient of variation of the powder of the FeO particles 11a represented by the above-mentioned (1) is 30% or less. This is because the coefficient of variation of the magnetic powder can be set to 30% or less accordingly. Note that the coefficient of variation of the powder of the FeO particles 11a can be obtained in a way similar to that for the above-mentioned coefficient of variation of the magnetic powder.

(Silica Coating Treatment)

Next, in Step S12, in order to suppress the aggregation of the FeO particles 11a during high-temperature heat treatment in a subsequent process, silica coating treatment is performed on the surfaces of the FeO particles 11a by a reverse micelle method to form silica coat layers 11b on the surfaces of the FeO particles 11a as shown in Part B of FIG. 3. As a result, a powder of silica-coated particles is prepared.

(Coating Agent Treatment)

Next, in Step S13, in order to further suppress the aggregation of the FeO particles 11a during high-temperature heat treatment in a subsequent process, the surface of each of the silica-coated particles is coated with coating agents 11c as shown in Part C of FIG. 3. As a result, a powder of coated particles is prepared. The coating agents 11c may partially cover the surface of each of the silica-coated particles or may cover the entire surface of each of the silica-coated particles. In order to further improve the effect of suppressing the aggregation of the FeO particles 11a, it is favorable that the coating agents 11c cover the entire surface of each of the silica-coated particles.

The metal chloride and the sulfate favorably contain at least one of Mg or Al. The metal chloride is, for example, at least one of poly aluminum chloride (PAC), aluminum chloride, or magnesium chloride. The sulfate is, for example, at least one of aluminum sulfate, aluminum ammonium sulfate, or magnesium sulfate.

The coating of the silica-coated particles with the coating agents 11c is performed in a solvent by utilizing, for example, the potential difference between the silica-coated particles and the coating agents 11c as described below. First, after dispersing the powder of the silica-coated particles in a solvent to prepare a dispersion liquid, the coating agents 11c are added to the dispersion liquid. Next, the zeta potentials of the silica-coated particles and the coating agents 11c are adjusted so that the zeta potential of the silica-coated particles is negative and the zeta potential of the coating agents 11c is positive. More specifically, the pH of the dispersion liquid is adjusted so that the zeta potential of the silica-coated particles is negative and the zeta potential of the coating agents 11c is positive. As a result, the surfaces of the silica-coated particles are coated with the coating agents 11c. By adjusting the pH, the pH of the dispersion liquid is favorably adjusted to 6 or more and 10 or less, and more favorably 7.5 or more and 8.5 or less. By adjusting the pH of the dispersion liquid to 6 or more and 10 or less, the zeta potential of the silica-coated particles can be made negative, and the zeta potential of the coating agents 11c can be made positive. After that, the dispersion liquid is washed and dried to obtain a powder of coated particles.

(High-Temperature Heat Treatment)

Subsequently, in Step S14, by firing the powder of coated particles at a high temperature of 1000° C. or more, the FeO particles 11a are phase-transformed into the ε-iron oxide particles 11 as shown in Part D of FIG. 3.

(Removal of Silica Coating and Coating Agent)

Finally, in Step S15, the silica coat layers 11b and the coating agents 11c on the surfaces of the ε-iron oxide particles 11 are removed using an alkaline solution. As a result, a powder of the ε-iron oxide particles (hard magnetic particles) 11 shown in Part E of FIG. 3 is obtained.

[Effects]

In the magnetic powder according to the first embodiment, the coefficient of variation of the magnetic powder represented by the above-mentioned formula (1) is 30% or less and the ratio B/A of the main peak height A and the sub-peak height B near the zero magnetic field in the SFD curve of the magnetic powder is 0.5 or less. As a result, it is possible to suppress the variation in particle size of the ε-iron oxide particles and obtain a magnetic powder having favorable magnetic properties. This magnetic powder is suitably applied to a magnetic recording medium having a high density.

In the method of producing the magnetic powder according to the first embodiment, the surfaces of the silica-coated particles are coated with the coating agents 11c including at least one of a metal chloride or a sulfate to prepare coated particles, and heat treatment is performed on the prepared coated particles to prepare the ε-iron oxide particles (hard magnetic particles) 11. As a result, even after the heat treatment at a high temperature for a long time, it is possible to suppress the aggregation of the FeO particles (precursor particles) 11a. That is, it is possible to suppress the generation of coarse particles.

Further, by coating the surfaces of the silica-coated particles with the coating agents 11c including at least one of a metal chloride and a sulfate, it is possible to promote the phase-transformation of the FeO particles (precursor particles) 11a into the ε-iron oxide particles 11. Therefore, it is possible to shorten the firing time.

In the method of producing the magnetic powder according to the first embodiment, since the powder of the FeO particles is synthesized by a liquid-phase complex thermal decomposition method, a powder of the FeO particles having a sharper particle size distribution is obtained. Since heat treatment is performed on the powder of the FeO particles having such a particle size distribution (i.e., a powder of the FeO particles having a small variation in particle size) to synthesize the powder of the ε-iron oxide particles, the formation of an α phase and γ phase is suppressed and a powder of high-purity ε-iron oxide particles containing few impurities can be obtained. Therefore, it is possible to obtain a powder of the ε-iron oxide particles of a single phase or the ε-iron oxide particles of a phase closer to a single phase.

Further, as described above, since heat treatment is performed on the powder of the FeO particles having a sharper particle size distribution to prepare a powder of the ε-iron oxide particles 11, it is possible to make the particle size distribution of the powder of the ε-iron oxide particles 11 sharper.

MODIFIED EXAMPLE

Modified Example 1

After the process of the synthesis of the FeO particles and before the process of silica coating treatment, the magnetic powder of the FeO particles 11a may be classified to obtain a powder of the FeO particles 11a having a sharper particle size distribution. In this case, since the variation in size of the ε-iron oxide particles can be further suppressed, it is possible to obtain a powder of the ε-iron oxide particles having more excellent magnetic properties.

Modified Example 2

Although the case where the coating agents 11c are added to a dispersion liquid and then the pH of the dispersion liquid is adjusted has been described in the above-mentioned first embodiment, a dispersion liquid is prepared by dispersing the silica-coated particles in a solvent and then the pH of the dispersion liquid may be adjusted before adding the coating agents 11c to the dispersion liquid. Further, the Ph of the solvent may be adjusted before adding the silica-coated particles to the solvent.

2 Second Embodiment

[Method of Producing Magnetic Powder]

Hereinafter, a method of producing a magnetic powder according to a second embodiment of the present disclosure will be described with reference to FIG. 4. This method of producing a magnetic powder synthesizes a powder of the ε-iron oxide particles using, as a starting material, a powder of nanoparticles (hereinafter, referred to as the "$Fe_3O_4$ particles".) containing $Fe_3O_4$ (triiron tetraoxide).

(Degassing Treatment)

First, in Step S21, a precursor solution is adjusted by mixing iron acetylacetonate in a solvent, and then degassing treatment is performed on the precursor solution. As the solvent, one that also functions as a ligand is used, and oleic acid and oleylamine are favorable. This is because $Fe_3O_4$ particles with less aggregation can be synthesized, and thus a powder of the $Fe_3O_4$ particles having a sharper particle size distribution can be obtained. Note that as the concentration of iron acetylacetonate in the precursor solution is increased, the size of the $Fe_3O_4$ particles as precursor particles can be increased.

The method of degassing treatment is not particularly limited. However, a method of performing heat treatment on the prepared solution under a reduced pressure atmosphere is favorable. By adopting this method, it is possible to suppress generation of bubbles even in the case where a larger amount of $Fe_3O_4$ particles are synthesized. Further, since those having a low boiling point among impurities contained in the precursor solution and water generated when oleic acid and oleylamine are mixed can be removed, it is easy to obtain $Fe_3O_4$ particles having a uniform particle size distribution even in a large-scale synthesis system.

Note that also by dissolving iron acetylacetonate as a raw material in a highly soluble solvent (e.g., phenylethyl ether) in advance, it is possible to suppress the generation of bubbles in a subsequent process. In the case where iron acetylacetonate is dissolved in a highly-soluble solvent in advance, degassing treatment may be performed or may not be performed.

(Liquid-Phase Thermal Decomposition Method)

Next, in Step S22, a powder of the $Fe_3O_4$ particles (precursor particles) as a starting material is synthesized by a liquid-phase complex thermal decomposition method using the solution on which degassing treatment has been performed. Specifically, the solution on which degassing treatment has been performed is heated under an inert gas atmosphere such as a nitrogen gas. As a result, nuclei are generated in the precursor solution, and then, the generated nuclei grow to synthesize the $Fe_3O_4$ particles.

The subsequent processes, i.e., the process of silica coating treatment (Step S12), the process of coating agent treatment (Step S13), the process of high-temperature heat treatment (Step S14), and the process of removal of silica coating and coating agent (Step S15) are similar to those of the method of producing the magnetic powder according to the first embodiment. Note that in the process of the high-temperature heat treatment in Step S14 the $Fe_3O_4$ particles are phase-transformed into the ε-iron oxide particles by high-temperature firing.

[Effects]

In the method of producing the magnetic powder according to the second embodiment, since the surfaces of the silica-coated particles are coated with a coating agent including at least one of a metal chloride and a sulfate, it is possible to suppress the generation of coarse particles similarly to the method of producing the magnetic powder according to the first embodiment.

Further, by coating the surfaces of the silica-coated particles with the coating agents 11c including at least one of a metal chloride and a sulfate, it is possible to promote the phase-transformation of the $Fe_3O_4$ particles (precursor particles) into the ε-iron oxide particles. Therefore, it is possible to shorten the firing time.

In the method of producing the magnetic powder according to the second embodiment, since the powder of the $Fe_3O_4$ particles is synthesized by a liquid-phase complex thermal decomposition method, a powder of the $Fe_3O_4$ particles having a sharper particle size distribution is obtained. Since heat treatment is performed on the powder of the $Fe_3O_4$ particles having such a particle size distribution (i.e., a powder of the $Fe_3O_4$ particles having a small variation in particle size) to synthesize the powder of the ε-iron oxide particles, the formation of an α phase and γ phase is suppressed and a powder of high-purity ε-iron oxide particles containing few impurities can be obtained. Therefore, it is possible to obtain a powder of the ε-iron oxide particles of a single phase or the ε-iron oxide particles of a phase closer to a single phase.

Further, as described above, since heat treatment is performed on the powder of the $Fe_3O_4$ particles having a sharper particle size distribution to prepare a powder of the ε-iron oxide particles, it is possible to make the particle size distribution of the powder of the ε-iron oxide particles sharper.

The $Fe_3O_4$ particles can be synthesized in a shorter time than the FeO particles. Therefore, in the method of producing the magnetic powder according to the second embodiment, it is possible to further improve the productivity of the powder of the ε-iron oxide particles.

MODIFIED EXAMPLE

Modified Example 1

After the process of the synthesis of the $Fe_3O_4$ particles and before the process of silica coating treatment, the magnetic powder of the $Fe_3O_4$ particles may be classified to obtain a powder of the $Fe_3O_4$ particles having a sharper particle size distribution. In this case, since the variation in size of the ε-iron oxide particles can be further suppressed, it is possible to obtain a powder of the ε-iron oxide particles having more excellent magnetic properties.

Modified Example 2

The method of synthesizing the $Fe_3O_4$ particles is not limited to the synthesis method described in the second embodiment. For example, any of the following synthesis methods (1) to (3) may be adopted.

<Synthesize Method (1)>

First, 1 mmol of trisodium citrate dihydrate, 4 mmol of sodium hydroxide (NaOH), and 0.2 mol of sodium nitrate ($NaNO_3$) are put into 19 ml of ion-exchanged water and stirred. After that, the mixture was heated to 100° C. to obtain a transparent liquid. Then, 2 mmol of iron sulfate tetrahydrate is added thereto, and the mixture is kept at 100° C. for one hour and cooled to room temperature. The $Fe_3O_4$ particles can be collected from the obtained solution by a magnet over several hours, and the collected $Fe_3O_4$ particles can be ultrasonically cleaned in water for several minutes to obtain stable $Fe_3O_4$ particles.

<Synthesis Method (2)>

First, 1 mmol of iron (III) acetylacetonate and 3 mmol of 1,2-hexadecanediol are put into a mixed solvent of 15 ml of oleic acid and 15 ml of oleylamine. Subsequently, the mixture is heated at 130° C. for 30 minutes under a reduced pressure atmosphere of approximately 200 Pa, and then heated at 300° C. for six hours under a nitrogen atmosphere of one atm. After finishing the heating, the solution is cooled to room temperature, and the obtained solution is washed with ethanol and hexane to obtain the $Fe_3O_4$ particles.

<Synthesis Method (3)>

The $Fe_3O_4$ particles are synthesized as follows using a single mode microwave system (Monowave 300). Note that this system is operable at 850 W/2.45 GHz at most. First, 1 mmol of iron (III) acetylacetonate is added to a mixed solvent of 4 ml of oleic acid, 10 ml of oleylamine, and 2 ml of 1-octadecene to prepare a solution, and the temperature is raised from room temperature to 200° C. in 10 minutes by applying the maximum output of 850 W of the single mode microwave system thereto, and kept for 10 minutes. After that, the solution is heated to 250° C. over 15 minutes, and kept for five minutes until the reaction is completed. Subsequently, the solution is cooled to 60° C. over approximately three minutes by compressed air, the obtained solution is washed with ethanol and acetone and is finally dried to obtain $Fe_3O_4$ particles.

Modified Example 3

Although the case where the FeO particles or the $Fe_3O_4$ particles are used as precursor particles has been described in the above-mentioned first and second embodiments, the precursor particles are not limited thereto and precursor particles (cubic iron oxide particles) or the like described in Patent Literature 1 may be used.

3 Third Embodiment

[Configuration of Magnetic Powder]

A magnetic powder according to a third embodiment of the present disclosure is a powder of ε-iron oxide particles having a core-shell structure. As shown in FIG. 5, the core-shell particles each include a core portion 12 and a shell portion 13 provided around this core portion 12. The core portion 12 and the shell portion 13 are exchange-coupled. At the interface between the core portion 12 and the shell portion 13, the composition and/or state of the both may change discontinuously or may change continuously. The magnetic powder according to the third embodiment is suitably used for a recording layer (magnetic layer) of a magnetic recording medium having a high density.

(Core Portion)

The core portion 12 is similar to the ε-iron oxide particles in the first embodiment.

(Shell Portion)

The shell portion 13 covers at least a part of the periphery of the core portion 12. Specifically, the shell portion 13 may partially cover the periphery of the core portion 12 or may cover the entire periphery of the core portion 12. From the viewpoint of making the exchange coupling between the core portion 12 and the shell portion 13 sufficient and improving the magnetic properties, it is favorable that the shell portion 13 covers the entire surface of the core portion 12.

The shell portion 13 contains α-Fe that is a soft magnetic material. The shell portion 13 can be obtained by, for example, reducing the surface of each of the ε-iron oxide particles (hard magnetic particles) as precursors of core-shell particles. Specifically, for example, α-Fe contained in the shell portion 13 can be obtained by reducing ε-iron oxide contained in the core portion 12.

[Method of Producing Magnetic Powder]

A method of producing the magnetic powder according to the third embodiment of the present disclosure is different from the method of producing the magnetic powder according to the first embodiment in that the method further includes the following process of reduction treatment (Step S16) after the process of coating removal (Step S15) as shown in FIG. 6.

(Reduction Treatment)

In Step S16, reduction treatment is performed on the powder of the ε-iron oxide particles 11 obtained by removing the silica coat layers 11b. Specifically, heat treatment is performed on the above-mentioned powder of the ε-iron oxide particles 11 under a high-temperature hydrogen atmosphere for a certain period of time to reduce the surfaces of the particles. As a result, the shell portion 13 containing α-Fe is formed around the core portion 12. In this way, a powder of the ε-iron oxide particles having a target core-shell structure can be obtained.

[Effects]

The magnetic powder according to the third embodiment includes a powder of core-shell particles including the core portion 12 containing ε-iron oxide and the shell portion 13 containing α-Fe. By forming a recording layer of a magnetic recording medium using this magnetic powder, it is possible to realize a magnetic recording medium having high output, excellent thermal stability, and high recordability.

In the method of producing the magnetic powder according to the third embodiment, reduction treatment is performed on ε-iron oxide particles that are hard magnetic particles to form core-shell particles including the shell portion 13 containing α-Fe that is a soft magnetic material. As a result, it is possible to prepare uniform core-shell particles, and cause the exchange interaction between the ε-iron oxide particles forming the core portion 12 and α-Fe forming the shell portion 13 to be uniformly expressed. Therefore, it is possible to utilize the characteristics of the soft magnetic material having a high saturation magnetization amount σs and obtain a high saturation magnetization σs as the whole core-shell particles. Similarly, recordability is improved because the coercive force Hc as the whole core-shell particles can be adjusted to the coercive force Hc suitable for recording while maintaining the coercive force Hc of the core portion 12 alone at a large value in order to ensure thermal stability. Further, since also the ε-iron oxide particles forming the core portion 12 can be made larger than in the existing method, it is easy to maintain a high coercive force Hc, which is advantageous in improving thermal stability.

Further, in the method of producing the magnetic powder according to the third embodiment, since reduction treatment is directly performed on the surfaces of the ε-iron oxide particles prepared in advance, the particle size of the ε-iron oxide particles as precursors and the particle size of the core-shell particles obtained by the reduction treatment are substantially similar to each other. Therefore, by adjusting the particle size of the ε-iron oxide particles as precursors, it is possible to prepare core-shell particles having a desired particle size. Therefore, it is possible to suppress the variation in the particle size distribution.

MODIFIED EXAMPLE

Modified Example 1

Reduction treatment may be performed on the powder of the ε-iron oxide particles 11 with calcium hydride ($CaH_2$). It is known that $CaH_2$ has a very strong reducing property. For this reason, $CaH_2$ can be used as a substitute for $H_2$ when the powder of the ε-iron oxide particles 11 is reduced to form α-Fe. Since $CaH_2$ has a very strong reducing property, reduction at a lower temperature than $H_2$ is possible. Further, it is also possible to suppress the aggregation of the ε-iron oxide particles 11 during the reduction.

Modified Example 2

Although the case where the method of producing the magnetic powder according to the first embodiment further includes the process of reduction treatment (Step S16) has been described in the above-mentioned third embodiment, the method of producing the magnetic powder according to the second embodiment may further include the process of reduction treatment (Step S16).

4 Fourth Embodiment

[Configuration of Magnetic Powder]

As shown in FIG. 7, a magnetic powder according to a fourth embodiment of the present disclosure is a powder of core-shell particles including the core portion 12 and a shell portion 14 that has a two-layer structure and is provided around this core portion 12. Similar parts as those in the third embodiment will be denoted by the same reference symbols, and description thereof will be omitted.

(Shell Portion)

The shell portion 14 having a two-layer structure includes a first shell portion 14a provided on the core portion 12 and a second shell portion 14b provided on the first shell portion 14a.

(First Shell Portion)

The first shell portion 14a that is a soft magnetic layer is similar to the shell portion 14 in the third embodiment.

(Second Shell Portion)

The second shell portion 14b is an oxide coating film as an oxidation prevention layer. The second shell portion 14b contains a material obtained by oxidizing α-Fe (soft magnetic material) contained in the first shell portion 14a, for example, at least one type of iron oxide of $Fe_3O_4$, $Fe_2O_3$, and FeO.

[Method of Producing Magnetic Powder]

A method of producing the magnetic powder according to the fourth embodiment of the present disclosure is different from the method of producing the magnetic powder according to the first embodiment in that the method further includes the following process of reduction treatment (Step S17) and the process of gradual oxidation treatment (Step S18) after the process of coating removal (Step S15) as shown in FIG. 8.

(Reduction Treatment)

In Step S17, reduction treatment is performed on the powder of the ε-iron oxide particles 11 obtained by removing the silica coat layers 11b. As a result, the first shell portion 14a containing α-Fe is formed around the core portion 12. Note that the reduction treatment in Step S17 is similar to the reduction treatment in Step S16 in the third embodiment.

(Gradual Oxidation Treatment)

In Step S18, gradual oxidation treatment is performed on the powder of the ε-iron oxide particles 11 whose surfaces are covered by the first shell portions 14a. Specifically, the above-mentioned powder of the ε-iron oxide particles 11 is cooled to room temperature under a nitrogen atmosphere and then heat treatment is performed under an atmosphere of a mixed gas of $O_2+N_2$ to form the second shell portion 14b as an oxide coating film on the outermost layer. As a result, it is possible to obtain a powder of the core-shell ε-iron oxide particle shaving excellent oxidation resistance.

[Effects]

In the magnetic powder according to the fourth embodiment, since the core-shell particles include the second shell portions 14b on the surfaces thereof, it is possible to prevent the surfaces of the core-shell particles from being exposed to the air to suppress the generation of rust or the like on the surfaces of the core-shell particles. Therefore, it is possible to suppress the characteristic deterioration of the magnetic powder.

MODIFIED EXAMPLE

Although the case where the method of producing the magnetic powder according to the first embodiment further includes the process of reduction treatment (Step S17) and the process of gradual oxidation treatment (Step S18) has been described in the above-mentioned fourth embodiment, the method of producing the magnetic powder according to the second embodiment may further include the process of reduction treatment (Step S17) and the process of gradual oxidation treatment (Step S18) has been described in the above-mentioned fourth embodiment.

5 Fifth Embodiment

[Configuration of Magnetic Recording Medium]

The magnetic recording medium according to a fifth embodiment of the present disclosure is a so-called tape-shaped magnetic recording medium, and includes a long substrate 21, an underlayer (non-magnetic layer) 22 provided on one main surface of the substrate 21, and a recording layer (magnetic layer) 23 provided on the underlayer 22 as shown in FIG. 9. Note that the underlayer 22 is provided as necessary and does not necessarily need to be provided. The magnetic recording medium may further include a protective layer (not shown) or the like provided on the recording layer 23 as necessary. Further, a backcoat layer 24 provided on the other main surface of the substrate 21 may be further provided as necessary.

(SFD)

In an SFD curve, the ratio B/A of the main peak height A and the sub-peak height B near the zero magnetic field is 0.5 or less (see FIG. 1). In the case where the ratio B/A exceeds 0.5, the particle size of the ε-iron oxide particles varies greatly, and there is a possibility that the magnetic properties of the recording layer 23 deteriorate and C/N (Carrier to Noise Ratio) deteriorates.

The above-mentioned ratio B/A is obtained as follows. First, a measurement sample is cut out from a long magnetic recording medium 10, and the M-H loop of the entire measurement sample corresponding to the perpendicular direction (thickness direction) of the magnetic recording medium is measured using VSM. Next, the coating film (the underlayer 22, the recording layer 23, the backcoat layer 24, and the like) is wiped using acetone, ethanol, or the like, leaving only the substrate 21 to obtain a sample for background correction. The M-H loop of the substrate 21 corresponding to the perpendicular direction (perpendicular direction of the magnetic recording medium) of the substrate 21 is measured using VSM. After that, the M-H loop of the substrate 21 is subtracted from the M-H loop of the entire measurement sample to obtain the M-H loop after background correction. After this, the ratio B/A is obtained in a way similar to that in the case of the magnetic powder according to the first embodiment. Note that in the case where the M-H loop after background correction is not saturated in the measurement of the M-H loop using VSM, SQUID that is capable of obtaining higher applied magnetic field is used. Further, "demagnetizing field correction" when measuring the M-H loop in the perpendicular direction is not performed.

(δ/Mrt)

δ/Mrt satisfies the relationship represented by the following formula (2).

$$2.0 \leq \delta/Mrt \leq 120.0 \qquad (2)$$

(However, δ [nm]: average thickness of the recording layer 23, Mrt [mA]: product of the residual magnetization amount and the thickness of the recording layer 23.)

In the case where an average thickness δ of the recording layer 23 is small, there is a possibility that the rate of the variation in average thickness δ to the average thickness δ inevitably increases, and C/N deteriorates accordingly. Meanwhile, in the case where the average thickness δ of the recording layer 23 is large, there is a possibility that the recorded magnetization forms a closed loop in the recording layer 23, which causes a decrease in output and deteriorates C/N. Further, in the case where Mrt is small, there is a possibility that output decreases and C/N deteriorates. Meanwhile, in the case where Mrt is large, there is a possibility that the reproduction head is saturated and favorable C/N is not obtained. In order to suppress the above-mentioned deterioration of C/N, δ/Mrt is made to satisfy the relationship represented by the above-mentioned formula (2).

The above-mentioned ratio δ/Mrt is calculated from δ [nm] and Mrt [mA] obtained as follows.

δ [nm] is obtained as follows. First, a magnetic recording medium to be measured is processed by an FIB (Focused Ion Beam) method or the like to prepare a slice for TEM observation, and the cross section of the slice is observed by TEM. The observation magnification is favorably at least 100,000 times or more so that the thickness of the recording layer 23 can be clearly observed. The observation of the cross section by TEM is performed at a total of five positions of the magnetic recording medium in the longitudinal direction (travelling direction) every 100 m. The observation direction at each of the positions is the lateral direction (width direction) of the magnetic recording medium. The thickness of the recording layer 23 is observed uniformly at 50 points per one visual field, and the thicknesses of all five visual fields are simply averaged (arithmetic average) to obtain the average thickness δ [nm] of the recording layer 23.

Mrt [mA] is obtained as follows. First, the M-H loop after background correction is obtained in a way similar to the above-mentioned method of calculating the ratio B/A. Next, a residual magnetization amount Mr [emu] is obtained from the obtained M-H loop after background correction, and divided by the area of the measurement sample to calculate Mrt [mA].

(Squareness Ratio)

It is favorable that a squareness ratio Rs in the direction perpendicular to the recording layer 23 is 60% or more. In the case where the squareness ratio Rs is less than 60%, there is a possibility that C/N deteriorates.

The squareness ratio Rs [%] is obtained as follows. First, the residual magnetization amount Mr [emu] is obtained in a way similar to the case where the above-mentioned "δ/Mrt" is obtained. Next, a magnetization amount Ms [emu] of a part of the M-H loop measured when obtaining the above-mentioned "δ/Mrt" is obtained, a sufficient magnetic field having been applied to the part of the M-H loop, the magnetization amount being saturated in the part of the M-H loop. Then, Mr [emu] obtained as described above is divided by Ms [emu] to calculate the squareness ratio Rs [%] (=(Mr/Ms)×100) of the M-H loop. Note that the above-mentioned Mr and Ms are values measured in the direction perpendicular to the recording layer 23.

(Substrate)

The substrate 21 as a support is a long non-magnetic substrate having flexibility. The non-magnetic substrate is a film, and the thickness of the film is, for example, 3 μm or more and 8 μm or less. As the material of the substrate 21, for example, polyesters such as polyethylene terephthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, plastics such as polycarbonate, polyimide, and polyamideimide, light metals such as such as an aluminum alloy and a titanium alloy, or ceramics such as alumina glass can be used.

(Recording Layer)

The recording layer 23 contains, for example, the magnetic powder according to the first embodiment, a binder, and conductive particles. Further, the recording layer 23 may further contain an additive such as a lubricant, an abrasive, and a rust inhibitor, as necessary.

As the binder, a resin having a structure in which a crosslinking reaction is imparted to a polyurethane resin, a vinyl chloride resin, or the like. However, the binder is not limited thereto, and another resin may be appropriately mixed depending on the physical properties required for the magnetic recording medium. The resin to be mixed is not particularly limited as long as it is a resin generally used in the coating-type magnetic recording medium.

Examples of the resin include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, a vinyl chloride-acrylonitrile copolymer, an acrylic ester-acrylonitrile copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyester resin, an amino resin, and synthetic rubber.

Further, examples of the thermosetting resin or reactive resin include a phenol resin, an epoxy resin, a urea resin, a melamine resin, an alkyd resin, a silicone resin, a polyamine resin, and a urea formaldehyde resin.

Further, polar functional groups such as $-SO_3M$, $-OSO_3M$, $-COOM$, $P=O(OM)_2$ may be introduced into each of the above-mentioned binders in order to improve the dispersibility of the magnetic powder. Here, M in the formula represents a hydrogen atom or an alkali metal such as lithium, potassium, and sodium.

Further, examples of the polar functional groups include a side chain type one having a terminal group of —NR1R2 or —NR1R2R3$^+$X$^-$, and a main chain type one having >NR1R2$^+$X$^-$. Here, R1, R2, and R3 in the formula each represent a hydrogen atom or a hydrocarbon group, and X$^-$ represents a halogen element ion such as fluorine, chlorine, bromine, and iodine, or an inorganic or organic ion. Further, examples of the polar functional groups include —OH, —SH, —CN, and an epoxy group.

The recording layer 23 may further contain, as non-magnetic reinforcing particles, aluminum oxide (α, β, or γ alumina), chromium oxide, silicon oxide, diamond, garnet, emery, boron nitride, titanium carbide, silicon carbide, titanium carbide, or titanium oxide (rutile type or anatase type titanium oxide).

The average thickness δ of the recording layer 23 is favorably 30 nm or more and 120 nm or less and more favorably 50 nm or more and 70 nm or less. In the case where the average thickness δ of the recording layer 23 is less than 30 nm, there is a possibility that it is difficult to form the recording layer 23 having a uniform thickness by coating. Meanwhile, in the case where the average thickness δ of the recording layer 23 exceeds 120 nm, there is a possibility that the output of a region having a short wavelength required for a magnetic recording medium having a high density deteriorates due to incoherent magnetization reversal or the like. Note that the method of calculating the average thickness δ of the above-mentioned recording layer 23 is as described in the method of calculating the ratio δ/Mrt.

(Underlayer)

The underlayer 22 is a non-magnetic layer containing a non-magnetic powder and a binder as main components. The underlayer 22 may further contain at least one type of additive, i.e., conductive particles, a lubricant, a curing agent, or a rust inhibitor, as necessary.

The non-magnetic powder may be an inorganic substance or an organic substance. Further, the non-magnetic powder may be carbon black or the like. Examples of the inorganic substance include a metal, a metal oxide, a metal carbonate, a metal sulfate, a metal nitride, a metal carbide, and a metal sulfide. Examples of the shape of the non-magnetic powder include, but not limited to, various shapes such as a needle shape, a spherical shape, a cubic shape, and a plate shape. The binder is similar to that in the above-mentioned recording layer 23.

The average thickness of the underlayer 22 is favorably 0.6 μm or more and 2.0 μm or less, and more favorably 0.8 μm or more and 1.4 μm or less. In the case where the average thickness of the underlayer 22 is less than 0.6 μm, there is a possibility that the electromagnetic conversion characteristics deteriorate due to the deterioration of the surface property. Meanwhile, in the case where the average thickness of the underlayer 22 exceeds 2.0 μm, there is a possibility that coarse protrusion are generated due to unevenness in drying of the coating film and the electromagnetic conversion characteristics deteriorate similarly. Note that the method of calculating the average thickness of the above-mentioned underlayer 22 is similar to the method of calculating the average thickness δ of the recording layer 23.

[Method of Producing Magnetic Recording Medium]

Next, an example of the method of producing the magnetic recording medium having the above-mentioned configuration will be described. First, a non-magnetic powder, a binder, and the like are kneaded and dispersed in a solvent to prepare a coating material for forming an underlayer. Next, the magnetic powder according to the first embodiment, a binder, and the like are kneaded and dispersed in a solvent to prepare a coating material for forming a recording layer. For the preparation of the coating material for forming a recording layer and the coating material for forming an underlayer, for example, the following solvent, dispersing device, and kneading device can be used.

Examples of the solvent used for the preparation of the above-mentioned coating material include a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

As the kneading device used for preparing the above-mentioned coating material, a kneading device such as a continuous twin-screw kneader, a continuous twin-screw kneader capable of diluting in multiple stages, a kneader, a pressure kneader, and a roll kneader can be used, but the kneading device is not limited to these devices. Further, as the dispersing device used for preparing the above-mentioned coating material, a dispersing device such as a roll mill, a ball mill, a horizontal sand mill, a vertical sand mill, a spike mill, a pin mill, a tower mill, a pearl mill (e.g., "DCP mill" manufactured by Eirich Co., Ltd.), a homogenizer, and an ultrasonic disperser can be used, but the dispersing device is not limited to these devices.

Next, the coating material for forming an underlayer is coated on one main surface of the substrate 21 and dried to form the underlayer 22. Next, the coating material for forming a recording layer is coated on this underlayer 22 and dried to form the recording layer 23 on the underlayer 22. Note that during the drying, the magnetic field of the magnetic powder may be oriented in the thickness direction of the substrate 21 by, for example, a solenoid coil. Next, as necessary, a protective layer and a lubricant layer may be formed on the recording layer 23 and the backcoat layer 24 may be formed on the other main surface of the substrate 21.

Next, the substrate 21 on which the underlayer 22 and the recording layer 23 have been formed is rewound on the large-diameter core and curing treatment is performed thereon. Next, calendaring treatment is performed on the substrate 21 on which the underlayer 22 and the recording layer 23 have been formed, and then the substrate 21 is cut into a predetermined width. In this way, a target magnetic recording medium can be obtained.

[Effects]

In the magnetic recording medium according to the fifth embodiment of the present disclosure, since the recording layer 23 contains the magnetic powder according to the first embodiment, it is possible to realize a magnetic recording medium having excellent magnetic properties. Therefore, it is possible to reproduce a signal recorded at high density with low noise. Therefore, it is possible to achieve high C/N.

MODIFIED EXAMPLE

The recording layer 23 may contain the magnetic powder according to the second, third, or fourth embodiment instead of the magnetic powder according to the first embodiment. In the case where the magnetic powder according to the third or fourth embodiment is used, it is possible to achieve C/N higher than that of the magnetic recording medium according to the fifth embodiment.

EXAMPLE

Hereinafter, the present disclosure will be specifically described by way of Examples, but the present disclosure is not limited to only these Examples.

Example 1

(Synthesis of FeO Nanoparticles)

FIG. 10 shows an outline of the process of synthesizing the FeO nanoparticles. First, 8.0 mmol of iron acetylacetonate, 20.0 mL of oleic acid, and 20.0 mL of oleylamine were weighed in a round-bottomed three-necked flask having a capacity of 300 ml, and pretreatment heating was performed at 210° C. under a reduced pressure atmosphere of 100 Pa for 36 hours.

Next, the atmosphere was changed to an $N_2$ atmosphere, the temperature was raised to 320° C., and heating was performed for 30 min. After that, the mixture was naturally cooled to room temperature, and centrifugation and washing were performed a plurality of times with ethanol to obtain the FeO nanoparticles as precursor particles. Finally, the obtained FeO nanoparticles were redispersed in cyclohexane. At this time, the obtained FeO nanoparticles undergo surface oxidation and change to $Fe_3O_4$ in some cases, but no influence on the generation of ε-iron oxide is observed.

(Silica Coating Treatment)

FIG. 11 shows an outline of the process of silica coating treatment. First, 80 mL of cyclohexane, 12 mL of polyoxyethylene(5)nonylphenyl ether (IGEPAL (registered trademark)), and 2 mL of aqueous ammonia were mixed in an eggplant flask having a capacity of 100 ml, and stirred at 600 rpm for 60 min while applying ultrasonic waves thereto until a transparent homogeneous solution is obtained.

The FeO nanoparticles dispersed in cyclohexane in advance were added thereto, and tetraethylorthosilicate (TEOS) was further added dropwise at an arbitrary rate so that the molar ratio of Fe/Si was 0.1. After the dropping, the mixture was further stirred at 600 rpm for 16 hours. After the reaction was finished, the operation of adding methanol thereto and performing centrifugation was repeated a plurality of times, and washing was performed. The precipitate obtained by the centrifugation was dried by a dryer at 60° C. to collect silica-coated FeO nanoparticles.

(Coating Treatment)

FIG. 12 shows an outline of the process of coating agent treatment (PAC treatment). First, the silica-coated FeO nanoparticles was dispersed in ion-exchanged water, and the pH of the dispersion liquid was measured with a pH meter while stirring the silica-coated FeO nanoparticles with a stirrer so that they would not settle. Subsequently, PAC as a coating agent was added dropwise to the dispersion liquid, and then, the pH of the dispersion liquid was adjusted using an acid and a base so that the pH of the dispersion liquid was 8.0. Then, the dispersion liquid after the pH adjustment was stirred, and then, ethanol was added thereto and the mixture was washed by centrifugation. After the washing, the dispersion liquid was dried and crushed in a mortar to obtain the silica-coated FeO nanoparticles on which PAC treatment was performed.

(High-Temperature Heat Treatment)

The silica-coated FeO nanoparticles on which the PAC treatment was performed were put into an alumina crucible, and the alumina crucible was placed in a muffle furnace. After that, the muffle furnace was heated to 1100° C., and firing was performed for 20 hours. As a result, a powder of nanoparticles was obtained.

(Removal of Silica Coating and Coating Agent)

FIG. 13 shows an outline of the process of removing the silica coating and the coating agent. First, the powder of nanoparticles and an NaOH aqueous solution adjusted to 5 M were put into a Teflon centrifuge tube (registered trademark), heated to 60° C. in an oil bath, and left for 24 hours. After that, the operation of adding ion-exchanged water thereto and performing centrifugal separation was repeated a plurality of times. Further, ethanol was added thereto, and then, centrifugation was performed. After that, the mixture was dried at 60° C. to obtain a powder of nanoparticles from which the silica coating and the coating agent were removed.

Example 2

A powder of nanoparticles was obtained in a way similar to that in Example 1 except that the pH was adjusted to 7.0 in the process of coating agent treatment.

Example 3

A powder of nanoparticles was obtained in a way similar to that in Example 1 except that the pH was adjusted to 9.0 in the process of coating agent treatment.

Example 4

A powder of nanoparticles was obtained in a way similar to that in Example 1 except that the pH was adjusted to 10.0 in the process of coating agent treatment.

Example 5

A powder of nanoparticles was obtained in a way similar to that in Example 1 except that the pH was adjusted to 6.1 in the process of coating agent treatment.

Example 6

A powder of nanoparticles was obtained in a way similar to that in Example 1 except that aluminum sulfate was used as a coating agent in the process of coating agent treatment.

Example 7

A powder of nanoparticles was obtained in a way similar to that in Example 1 except that ammonium aluminum sulfate was used in the process of coating agent treatment.

Example 8

A powder of nanoparticles was obtained in a way similar to that in Example 1 except that magnesium sulfate was used as a coating agent in the process of coating agent treatment.

Example 9

A powder of nanoparticles was obtained in a way similar to that in Example 1 except that magnesium chloride was used as a coating agent in the process of PAC treatment.

Example 10

A powder of nanoparticles was obtained in a way similar to that in Example 1 except that $Fe_3O_4$ nanoparticles were synthesized as precursor particles instead of the FeO nanoparticles. Note that the difference in the thickness of the silica coating between Example 10 and Example 1 as shown in Table 1 is due to not the change in conditions of silica coating treatment but the difference in the particle diameter of the precursor particles. The process of synthesizing the $Fe_3O_4$ nanoparticles will be described below.

(Synthesis of $Fe_3O_4$ Nanoparticles)

FIG. 14 shows an outline of the process of synthesizing $Fe_3O_4$ nanoparticles as precursor particles. First, 30.0 mmol of iron acetylacetonate, 20.0 mL of oleic acid, and 30.0 mL oleylamine were weighed in a round-bottomed three-necked flask having a capacity of 300 ml and mixed to prepare a solution. Next, the solution was heated at 130° C. under a reduced pressure atmosphere of 100 Pa for one hour to degassing treatment.

Next, the atmosphere was changed to an $N_2$ atmosphere, the temperature was raised to 310° C., and heating was performed for six hours. After that, the mixture was naturally cooled to room temperature, and centrifugation and washing were performed a plurality of times with ethanol to obtain $Fe_3O_4$ nanoparticles as precursor particles. Finally, the obtained $Fe_3O_4$ nanoparticles were redispersed in cyclohexane.

Example 11

A powder of nanoparticles was obtained in a way similar to that in Example 1 except that the pretreatment heating was performed for 47 hours in the process of synthesizing the FeO nanoparticles and the amount of added TEOS was set to Fe/Si=0.03 in the process of silica coating treatment to obtain the thickness of silica coating of 10 nm.

Example 12

A powder of nanoparticles was obtained in a way similar to that in Example 1 except that the pretreatment heating was performed for 24 hours in the process of synthesizing the FeO nanoparticles. Note that the difference in the thickness of the silica coating between Example 12 and Example 1 as shown in Table 1 is due to not the change in conditions of silica coating treatment but the difference in the particle diameter of the precursor particles.

Comparative Example 1

A powder of nanoparticles was obtained in a way similar to that in Example 1 except that the process of coating agent treatment was omitted.

Comparative Example 2

A powder of nanoparticles was obtained in a way similar to that in Example 1 except that the pH was adjusted to 5.0 in the process of coating agent treatment.

Comparative Example 3

A powder of nanoparticles was obtained in a way similar to that in Example 6 except that the pH was adjusted to 4.0 in the process of coating agent treatment.

Comparative Example 4

A powder of nanoparticles was obtained in a way similar to that in Example 1 except that iron chloride was used as a coating agent in the process of coating agent treatment.

Comparative Example 5

A powder of nanoparticles was obtained in a way similar to that in Example 1 except that the pH was adjusted to 10.5 in the process of coating agent treatment.

Table 1 shows the synthesis conditions and evaluation results of the nanoparticles in Examples 1 to 12 and Comparative Examples 1 to 5.

TABLE 1

| | Precursor particle | Crystallite size (nm) | Silica coating thickness (nm) | Dispersion liquid pH | Coating material | Firing temperature (° C.) | Firing time (h) | Crystal size of ε-iron oxide after firing (nm) | Crystalline phase identification result by XRD | B/A |
|---|---|---|---|---|---|---|---|---|---|---|
| Example 1 | FeO | 23 | 25 | 8.0 | PAC | 1100 | 20 | 28 | ε-iron oxide | 0.2 |
| Example 2 | FeO | 23 | 25 | 7.0 | PAC | 1100 | 20 | 27 | ε-iron oxide | 0.4 |
| Example 3 | FeO | 23 | 25 | 9.0 | PAC | 1100 | 20 | 28 | ε-iron oxide | 0.23 |
| Example 4 | FeO | 23 | 25 | 10.0 | PAC | 1100 | 20 | 25 | ε-iron oxide | 0.25 |
| Example 5 | FeO | 23 | 25 | 6.1 | PAC | 1100 | 20 | 28 | ε-iron oxide | 0.45 |
| Example 6 | FeO | 23 | 25 | 8.0 | Aluminum sulfate | 1100 | 20 | 28 | ε-iron oxide | 0.26 |
| Example 7 | FeO | 23 | 25 | 8.0 | Ammonium sulfate aluminum | 1100 | 20 | 28 | ε-iron oxide | 0.25 |
| Example 8 | FeO | 23 | 25 | 8.0 | Magnesium sulfate | 1100 | 20 | 28 | ε-iron oxide | 0.27 |
| Example 9 | FeO | 23 | 25 | 8.0 | Magnesium chloride | 1100 | 20 | 28 | ε-iron oxide | 0.27 |
| Example 10 | $Fe_3O_4$ | 25 | 27 | 8.0 | PAC | 1100 | 20 | 28 | ε-iron oxide | 0.21 |
| Example 11 | FeO | 5 | 10 | 8.0 | PAC | 1100 | 20 | 7 | ε-iron oxide | 1 or more |
| Example 12 | FeO | 40 | 40 | 8.0 | PAC | 1100 | 20 | 45 | ε-iron oxide | 0.4 |
| Comparative Example 1 | FeO | 23 | 25 | — | None | 1100 | 20 | 17 | ε-iron oxide, γ-iron oxide | 1 or more |
| Comparative Example 2 | FeO | 23 | 25 | 5.0 | PAC | 1100 | 20 | Cannot calculate | γ-iron oxide | 1 or more |
| Comparative Example 3 | FeO | 23 | 25 | 4.0 | Aluminum sulfate | 1100 | 20 | Cannot calculate | γ-iron oxide | 1 or more |

TABLE 1-continued

|  | Precursor particle | Crystallite size (nm) | Silica coating thickness (nm) | Dispersion liquid pH | Coating material | Firing temperature (° C.) | Firing time (h) | Crystal size of ε-iron oxide after firing (nm) | Crystalline phase identification result by XRD | B/A |
|---|---|---|---|---|---|---|---|---|---|---|
| Comparative Example 4 | FeO | 23 | 25 | 8.0 | Iron chloride | 1100 | 20 | Cannot calculate | Iron oxychloride, γ-iron oxide | 1 or more |
| Comparative Example 5 | FeO | 23 | 25 | 10.5 | PAC | 1100 | 20 | 50 | α-iron oxide, ε-iron oxide | 1 or more |

(Evaluation by XRD)

The crystal structure of the nanoparticles was identified and the crystallite size was obtained as follows. First, θ-2θ measurement was performed using an X-ray diffraction (XRD) device to obtain information regarding the crystal structure of the magnetic powder. Next, a crystallite size L was obtained by applying the Scherrer's formula to the diffraction peaks obtained from the crystal plane (1,2,2) of the ε-iron oxide obtained by the measurement.

Scherrer's formula: $L = K\lambda/B \cos\theta$ $\lambda$: Wavelength of measured X-ray (A)
B: Spread of diffraction line due to crystallite size (radian unit)
$\theta$: Bragg angle of diffraction line
K: Scherrer constant (=0.94)

(Evaluation of Ratio B/A)

The ratio B/A of the powder of nanoparticles was obtained in the procedure described in the above-mentioned first embodiment.

The following can be seen from Table 1.

In Examples 1 to 10 in which (1) the process of coating agent treatment is included, (2) a metal chloride and a sulfate containing Mg or Al are used as coating agents, and (3) the pH of the dispersion liquid is six or more, it is possible to synthesize the powder of ε-iron oxide nanoparticles in a short time of 20 hours of firing time. This is presumably because the phase transformation from FeO phase or $Fe_3O_4$ phase to the $\varepsilon\text{-}Fe_2O_3$ phase was promoted by covering the surfaces of the silica-coated precursor particles (the silica-coated FeO nanoparticles, silica-coated $Fe_3O_4$ nanoparticles) with a metal chloride and a sulfate containing at least one of Mg or Al, which shortens the firing time.

Further, in Examples 1 to 10, the ratio B/A (see FIG. 1) of the main peak height A in an SFD curve of magnetic particles and the sub-peak height B near the zero magnetic field can be set to 0.5 or less. This is presumably because the aggregation of precursor particles (i.e., generation of coarse particles) is suppressed by covering the surfaces of the silica-coated precursor particles with a metal chloride and a sulfate containing at least one of Mg and Al, which suppresses the variation in the particle size of the ε-iron oxide particles.

In Comparative Example 1 in which (1') the process of coating agent treatment is not included, nanoparticles of a mixed phase formed of ε-iron oxide and γ-iron oxide are synthesized in a short time of 20 hours of firing time. This is presumably because the phase transformation from the FeO phase to the $\varepsilon\text{-}Fe_2O_3$ phase is not promoted only by performing silica coating treatment on the surfaces of precursor particles (FeO nanoparticles) and the $\varepsilon\text{-}Fe_2O_3$ phase of a substantially single phase cannot be obtained.

From the evaluation results of Examples 1, 11, and 12, it can be seen that the crystallite size of the ε-iron oxide particles obtained after firing can be adjusted by adjusting the crystallite size of precursor particles (FeO particles). Note that the ratio B/A in Example 11 is one or more. This is presumably due to not the aggregation of precursor particles in the process of high-temperature heat treatment but superparamagnetism that has occurred due to miniaturization of the crystallite size, which deteriorates the magnetic properties.

Further, in Comparative Example 1, the ratio B/A is one or more. This is presumably because the aggregation of precursor particles cannot be sufficiently suppressed (i.e., generation of coarse particles cannot be sufficiently suppressed) in the process of high-temperature heat treatment (firing process) only by performing silica coating treatment on the surfaces of precursor particles, which cannot suppress the variation in the particle size of the ε-iron oxide particles, and because the $\varepsilon\text{-}Fe_2O_3$ phase of a single phase cannot be obtained as described above.

In Comparative Examples 2 and 3 in which (1) the process of coating agent treatment is included, (2) a metal chloride and a sulfate containing Mg or Al are used as coating agents, but (3') the pH of the dispersion liquid is less than six, a powder of γ-iron oxide nanoparticles is synthesized. Further, the ratio B/A is one or more. These results are presumably due to the fact that the surfaces of the silica-coated precursor particles cannot be coated with the coating agent because the zeta potential of the silica-coated precursor particles and the zeta potential of the coating agent are both positive in the case where the pH of the dispersion liquid is adjusted to less than six.

In Comparative Example 4 in which (1) the process of coating agent treatment is included, (3) the pH of the dispersion liquid is six or more, but (2') a metal chloride containing iron is used as a coating agent, nanoparticles of a mixed phase of Iron oxychloride and γ-iron oxide are synthesized. This is presumably because the action obtained by a metal chloride and a sulfate containing Mg or Al is not exhibited in the case of using a metal chloride containing iron.

In Comparative Example 5 in which (1) the process of coating agent treatment is included, (2) a metal chloride and a sulfate containing Mg or Al are used as coating agents, but (3') the pH of the dispersion liquid exceeds 10, nanoparticles of a mixed phase of ε-iron oxide and α-iron oxide are synthesized. This is presumably because the surfaces of the silica-coated precursor particles cannot be coated with the coating agent since the zeta potential of the silica-coated precursor particles and the zeta potential of the coating agent are both negative in the case where the pH of the dispersion liquid is adjusted be more than 10.

Although embodiments of the present disclosure and modified examples thereof have been specifically described above, the present disclosure is not limited to the above-mentioned embodiments and the modified examples thereof and various modifications can be made on the basis of the technical idea of the present disclosure.

For example, the configurations, the methods, the processes, the shapes, the materials, and the numerical values cited in the above-mentioned embodiments and the modified examples thereof are only illustrative, and different configurations, methods, processes, shapes, materials, and numerical values may be used as necessary. In addition, the chemical formulae of compounds and the like are representative ones, and the valences and the like are not limited as long as they represent common names of the same compound.

Also, the configurations, the methods, the processes, the shapes, the materials, and the numerical values in the above-mentioned embodiments and the modified examples thereof can be combined without departing from the essence of the present disclosure.

It should be noted that the present disclosure may take the following configurations.

(1)
A method of producing a magnetic powder, including:
coating a surface of each of silica-coated precursor particles with at least one type of coating agent of a metal chloride or a sulfate; and
firing the precursor particles coated with the coating agent.

(2)
The method of producing a magnetic powder according to (1), in which
each of the metal chloride and the sulfate contains at least one of Mg or Al.

(3)
The method of producing a magnetic powder according to (1) or (2), in which
the metal chloride is at least one of poly aluminum chloride (PAC), aluminum chloride, or magnesium chloride, and
the sulfate is at least one of aluminum sulfate, aluminum ammonium sulfate, or magnesium sulfate.

(4)
The method of producing a magnetic powder according to any one of (1) to (3), in which
the coating with the coating agent is performed utilizing a potential difference between the silica-coated precursor particles and the coating agent.

(5)
The method of producing a magnetic powder according to any one of (1) to (3), in which
the coating with the coating agent is performed by adjusting a zeta potential of the silica-coated precursor particles and a zeta potential of the coating agent so that the zeta potential of the silica-coated precursor particles is negative and the zeta potential of the coating agent is positive.

(6)
The method of producing a magnetic powder according to any one of (1) to (3), in which
the coating with the coting agent includes
adding the silica-coated precursor particles and the coating agent to a solvent, and
adjusting a pH of the solvent so that a zeta potential of the silica-coated precursor particles is negative and a zeta potential of the coating agent is positive.

(7)
The method of producing a magnetic powder according to (6), in which the pH of the solvent is adjusted to 6 or more and 10 or less by the adjusting of the pH.

(8)
The method of producing a magnetic powder according to any one of (1) to (7), in which
the precursor particles are phase-transformed by the firing.

(9)
The method of producing a magnetic powder according to (8), in which
magnetic particles containing ε-iron oxide are obtained by the phase-transformation.

(10)
The method of producing a magnetic powder according to (9), in which
the precursor particles contain ferrous oxide or triiron tetraoxide.

(11)
The method of producing a magnetic powder according to (9) or (10), in which
a crystallite size of each of the magnetic particles is 8 nm or more and 30 nm or less.

(12)
The method of producing a magnetic powder according to any one of (9) to (11), in which
a ratio B/A of a main peak height A in an SFD (Switching Field Distribution) curve of the magnetic particles and a sub-peak height B near a zero magnetic field is 0.5 or less.

(13)
The method of producing a magnetic powder according to any one of (9) to (12), further including:
preparing the precursor particles by a liquid-phase thermal decomposition method before the coating with the coating agent; and
coating the prepared precursor particles with silica.

(14)
The method of producing a magnetic powder according to (13), in which
the preparing of the precursor particles by the liquid-phase thermal decomposition method includes performing degassing treatment on a solution containing iron acetylacetonate and then preparing the precursor particles by heating treatment.

(15)
The method of producing a magnetic powder according to any one of (9) to (14), further including:
removing the silica coating and the coating agent from the magnetic particles after the firing; and
performing reduction treatment on the magnetic particles after the removing.

(16)
The method of producing a magnetic powder according to (15), further including:
performing oxidation treatment on the magnetic particles after the reduction treatment.

(17)
A method of producing a magnetic recording medium, including:
coating a surface of each of silica-coated precursor particles with at least one type of coating agent of a metal chloride or a sulfate;
preparing magnetic particles by firing the precursor particles coated with the coating agent;
removing the silica coating and the coating agent from the magnetic particles; and forming a recording layer using the magnetic particles after the removing.

REFERENCE SIGNS LIST

11 ε-iron oxide particles (magnetic particles)
11a FeO particles (precursor particles)
11b silica coat layer
11c coating agent
12 core portion
13, 14 shell portion
14a first shell portion
14b second shell portion
21 substrate
22 underlayer
23 recording layer
24 backcoat layer

The invention claimed is:

1. A method of producing a magnetic powder, comprising:
coating a surface of each of silica-coated precursor particles with at least one type of a coating agent including a metal chloride or a sulfate; and
firing the silica-coated precursor particles coated with the coating agent,
wherein the silica-coated precursor particles are phase-transformed by the firing.

2. The method of producing a magnetic powder according to claim 1, wherein
each of the metal chloride and the sulfate contains at least one of Mg or Al.

3. The method of producing a magnetic powder according to claim 1, wherein
the metal chloride is at least one of poly aluminum chloride (PAC), aluminum chloride, or magnesium chloride, and
the sulfate is at least one of aluminum sulfate, aluminum ammonium sulfate, or magnesium sulfate.

4. The method of producing a magnetic powder according to claim 1, wherein
the coating with the coating agent is performed utilizing a potential difference between the silica-coated precursor particles and the coating agent.

5. The method of producing a magnetic powder according to claim 1, wherein
the coating with the coating agent is performed by adjusting a zeta potential of the silica-coated precursor particles and a zeta potential of the coating agent so that the zeta potential of the silica-coated precursor particles is negative and the zeta potential of the coating agent is positive.

6. The method of producing a magnetic powder according to claim 1, wherein
the coating with the coting agent includes
adding the silica-coated precursor particles and the coating agent to a solvent, and
adjusting a pH of the solvent so that a zeta potential of the silica-coated precursor particles is negative and a zeta potential of the coating agent is positive.

7. The method of producing a magnetic powder according to claim 6, wherein
the pH of the solvent is adjusted to 6 or more and 10 or less by the adjusting of the pH.

8. The method of producing a magnetic powder according to claim 1, wherein
magnetic particles containing ε-iron oxide are obtained by the phase-transformation.

9. The method of producing a magnetic powder according to claim 8, wherein
the precursor silica-coated particles contain ferrous oxide or triiron tetraoxide.

10. The method of producing a magnetic powder according to claim 8, wherein
a crystallite size of each of the magnetic particles is 8 nm or more and 30 nm or less.

11. The method of producing a magnetic powder according to claim 8, wherein
a ratio B/A of a main peak height A in an SFD (Switching Field Distribution) curve of the magnetic particles and a sub-peak height B near a zero magnetic field is 0.5 or less.

12. The method of producing a magnetic powder according to claim 8, further comprising:
preparing the precursor silica-coated particles by a liquid-phase thermal decomposition method before the coating with the coating agent; and
coating the prepared precursor silica-coated particles with silica.

13. The method of producing a magnetic powder according to claim 12, wherein
the preparing of the precursor silica-coated particles by the liquid-phase thermal decomposition method includes performing degassing treatment on a solution containing iron acetylacetonate and then preparing the precursor silica-coated particles by heating treatment.

14. The method of producing a magnetic powder according to claim 8, further comprising:
removing the silica coating and the coating agent from the magnetic particles after the firing; and
performing reduction treatment on the magnetic particles after the removing.

15. The method of producing a magnetic powder according to claim 14, further comprising:
performing oxidation treatment on the magnetic particles after the reduction treatment.

16. A method of producing a magnetic recording medium, comprising:
coating a surface of each of silica-coated precursor particles with at least one type of coating agent including a metal chloride or a sulfate;
preparing magnetic particles by firing the precursor silica-coated particles coated with the coating agent;
removing the silica coating and the coating agent from the magnetic particles; and
forming a recording layer using the magnetic particles after the removing.

* * * * *